United States Patent [19]

Fanning et al.

[11] Patent Number: 5,622,627

[45] Date of Patent: Apr. 22, 1997

[54] PARTS WASHER SYSTEM

[75] Inventors: Chris E. Fanning, Oklahoma City; Gary C. Garrett, Edmond, both of Okla.

[73] Assignee: Advanced Waste Reduction, Inc., Tulsa, Okla.

[21] Appl. No.: 230,572

[22] Filed: Apr. 21, 1994

Related U.S. Application Data

[63] Continuation-in-part of Ser. No. 117,265, Sep. 3, 1993, abandoned.

[51] Int. Cl.⁶ .................................................. C02F 9/00
[52] U.S. Cl. ........................ 210/650; 210/669; 210/688; 210/693; 210/776; 210/805; 210/806
[58] Field of Search .................................... 210/650, 663, 210/669, 688, 693, 776, 799, 805, 806, 510.1

[56] References Cited

U.S. PATENT DOCUMENTS

| | | | |
|---|---|---|---|
| 2,297,817 | 10/1942 | Truxell et al. | 210/510.1 |
| 3,890,254 | 6/1975 | Guthrie | 260/2.5 BD |
| 4,517,069 | 5/1985 | Harney | 204/290 F |
| 4,642,192 | 2/1987 | Heskett | 210/638 |
| 4,687,553 | 8/1987 | Solomon | 204/16 |
| 4,975,230 | 12/1990 | Pinkhasov | 264/59 |
| 5,122,274 | 6/1992 | Heskett | 210/638 |
| 5,135,654 | 8/1992 | Heskett | 210/638 |
| 5,151,222 | 9/1992 | Ruffoni | 252/511 |
| 5,185,381 | 2/1993 | Ruffoni | 521/52 |
| 5,259,960 | 11/1993 | Beck et al. | 210/767 |

OTHER PUBLICATIONS

Photocopy, Fluid Treatment, Inc. Brochure (undated).
Photocopy, Astromet, Inc. Brochure & accompanying papers (undated).
Photocopy, Filtering Media By Matt–Son, Matt–Son, Inc., Mar. 1, 1990.

*Primary Examiner*—Ivars Cintins
*Attorney, Agent, or Firm*—Dunlap & Codding, P.C.

[57] ABSTRACT

A system for removing free-oils, particulate matter and dissolved heavy metals from an aqueous surfactant solution employed in the degreasing and cleaning of parts in a parts washer. The system includes a primary filter assembly containing an oil absorbent, a particulate matter filter and a filter element having metal particles bound together in a porous metal sponge-like structure. The system can also include a secondary filter assembly capable of removing residual free, dissolved and emulsified oils, particulate matter and dissolved heavy metals from the filtrate produced by passage of the contaminated aqueous surfactant solution through the primary filter assembly.

57 Claims, 4 Drawing Sheets

PARTS WASHER SYSTEM

RELATED APPLICATIONS

This application is a continuation-in-part of U.S. Ser. No. 08/117/265 filed Sep. 3, 1993 entitled: "FILTERING METHOD WHERE FLUID OR GAS IS PASSED THROUGH FILTER ELEMENT OF METAL PARTICLES INTERCONNECTED IN SPONGE-LIKE FORM", now abandoned.

FIELD OF THE INVENTION

The present invention relates generally to parts washer systems and, more particularly, but not by way of limitation, to a parts washer system adapted to remove contaminants from an aqueous based surfactant solution employed in the parts washer system for degreasing parts.

DESCRIPTION OF THE PREFERRED EMBODIMENTS

The degreasing of parts has been a problem which has long existed in the field of parts cleaning and reclamation. Because of environmental and health considerations, aqueous based systems have been heretofore proposed as a replacement for solvent based systems in the degreasing of parts. However, problems exist in the use of aqueous based systems for degreasing of parts, such as poor cleaning performance, disposal problems resulting from oil emulsions generated during the cleaning procedure, the short effective life of the cleaning solutions, bacterial growth in the cleaning solution and excessive foaming of the cleaning solution. Further, heavy metals contamination of the cleaning solution present problems in the disposal of the spent aqueous cleaning solution.

Figure 1:
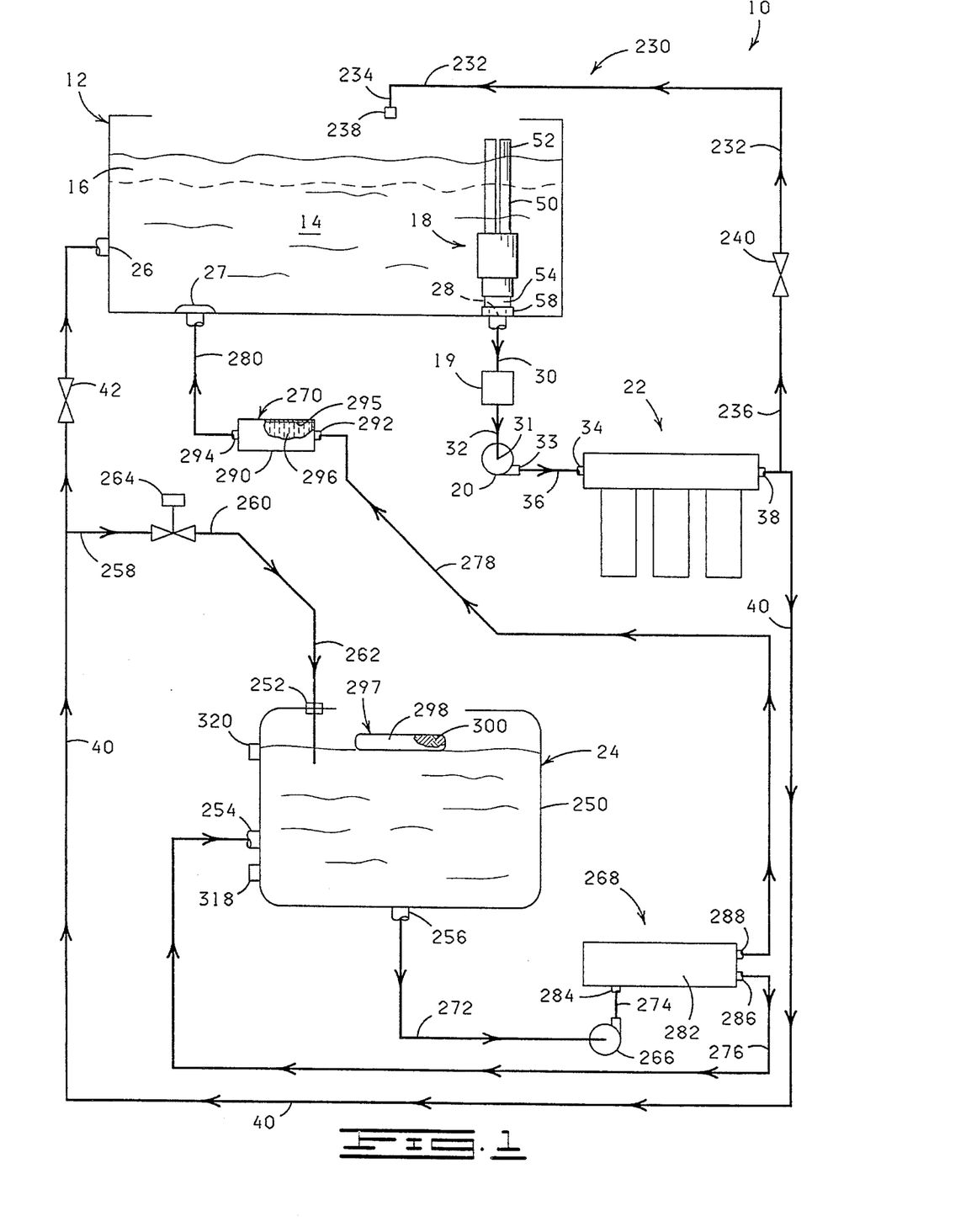
FIG. 1 is diagrammatic view of a parts washer system constructed in accordance with the present invention.

Shown in FIG. 1 is a parts washer system 10 constructed in accordance with the present invention which substantially eliminates the above referenced problems associated with aqueous based systems for degreasing and washing parts. That is, the parts washer system 10 provides effective bacterial growth control and pH control of the aqueous surfactant solution employed in the parts washer system 10 without chemical additives, while removing free oils, particulate matter and dissolved heavy metals from the aqueous surfactant solution.

The parts washer system 10 includes a primary cleaning vessel 12 containing an aqueous surfactant solution 14. When the parts washer system 10 is in a parts cleaning cycle or mode, the aqueous surfactant solution 14, which includes a layer of oil 16 formed on the upper surface of the aqueous surfactant solution 14, is removed from the primary cleaning vessel 12 by a suction skimmer 18, passed through a strainer 19, and pumped under pressure by a pump 20 through a primary filter assembly 22 wherein free oils, particulate matter and dissolved heavy metals are removed from the aqueous surfactant solution 14. The filtered aqueous surfactant solution, herein after referred to as the resulting filtrate, can then be returned to the primary cleaning vessel 12, or the resulting filtrate can be divided into a first stream and second stream wherein the first stream, which constitutes a major portion of the resulting filtrate, is returned to the primary cleaning vessel 12 and the second stream, which constitutes a minor portion of the resulting filtrate, is passed through a secondary filter assembly 24 prior to being returned to the second stream to the primary cleaning vessel 12. However, when the parts washer system 10 is in a solution cleaning cycle or mode, the aqueous surfactant solution is gravitationally fed from the primary cleaning vessel 12 to the secondary filter assembly 14 prior to being returned to the primary cleaning vessel in a manner which will be more fully described hereinafter.

The primary cleaning vessel 12 is provided with a primary fluid inlet 26, a secondary fluid inlet 27 and a fluid outlet 28. The suction skimmer 18 is disposed within the primary cleaning vessel 12 and connected to the fluid outlet 28 of the primary cleaning vessel 12 so that fluid communication is established between the suction skimmer 18 and the fluid outlet 28 of the primary cleaning vessel 12. The strainer 19, a conventional screen-type strainer having a mesh size of about 80 mesh, is disposed between the fluid outlet 28 of the primary cleaning vessel 12 and the pump 20. That is, the fluid outlet 28 of the primary cleaning vessel 12 is connected to the strainer 19 via a conduit 30, and the strainer 19 is connected to a suction port 31 of the pump 20 via a conduit 32 so that fluid communication is provided between the primary cleaning vessel 12 and the pump 20.

An outlet port 33 of the pump 20 is connected to an inlet 34 of the primary filter assembly 22 via a conduit 36 so that fluid communication is provided therebetween. An outlet 38 of the primary filter assembly 22 is connected to the primary fluid inlet 26 of the primary cleaning vessel 12 via a conduit 40. A throttle valve 42 is disposed within the conduit 40 downstream of the primary filter assembly 22 so that the rate of discharge of the resulting filtrate into the primary cleaning vessel 12 can be selectively controlled. Thus, upon actuation of the pump 20, aqueous surfactant solution 14 withdrawn from the primary cleaning vessel 12 via the suction skimmer 18, is passed through the strainer 19, pumped under pressure by the pump 20 through the primary filter assembly 22 and the resulting filtrate is returned to the primary cleaning vessel 12 as a processed aqueous surfactant solution substantially free of free-oils, particulate matter and dissolved heavy metals.

The unique design of the suction skimmer 18 permits the aqueous surfactant solution 14 to be withdrawn from the primary cleaning vessel 12 under substantially laminar flow conditions while providing substantially vertical flow of the aqueous surfactant solution 14 through at least a portion of the suction skimmer 18; and the design of the primary filter assembly 22 provides bacterial growth control in the aqueous surfactant solution 14, as well as pH control of the aqueous surfactant solution 14.

Figure 2:
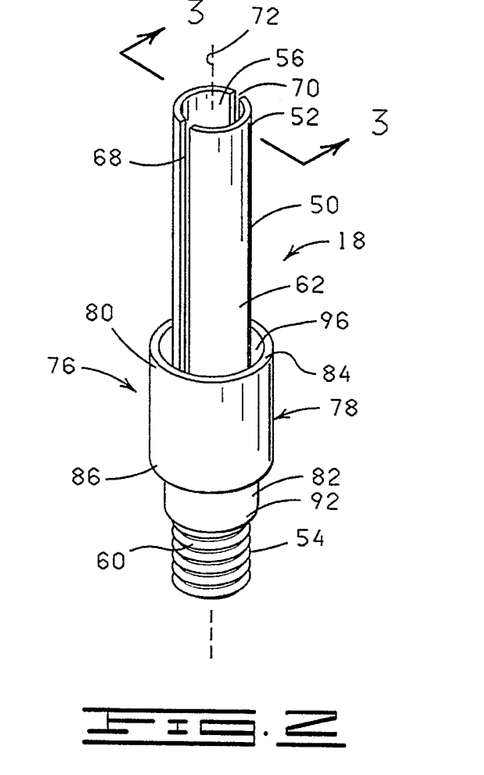
FIG. 2 is a perspective view of a suction skimmer of the parts washing system of the present invention.
Figure 3:
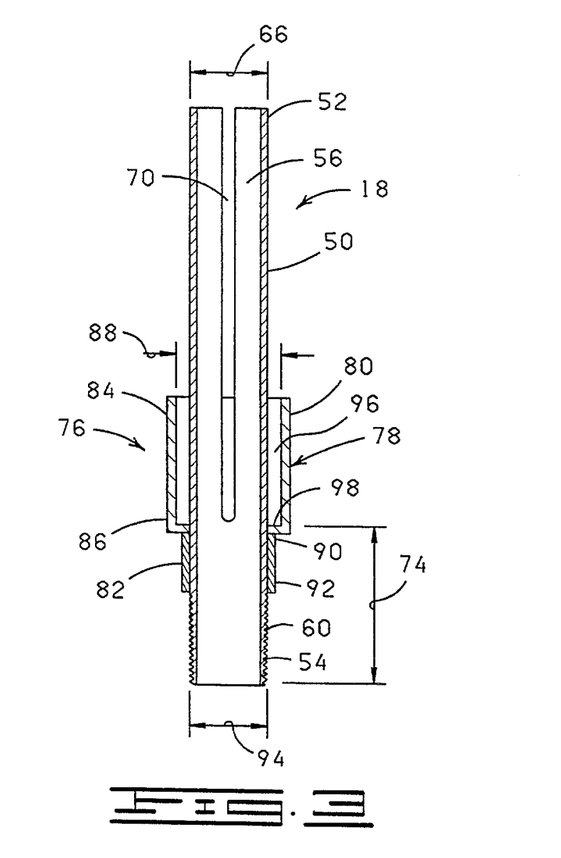
FIG. 3 is a cross sectional view of the suction skimmer of FIG. 2 taken along lines 3—3.

As more clearly shown in FIGS. 2 and 3, the suction skimmer 18 of the primary filter assembly 22 includes an elongated body member 50 having a first end 52, a second end 54 and a fluid flow passageway 56 extending therebetween. The second end 54 of the body member 50 is connected to a bulkhead connection 58 (FIG. 1) of the primary cleaning vessel 12 so that body member 50 is substantially vertically disposed and the first end 52 of the body member 50 extends a distance above the aqueous surfactant solution 14 and the layer of oil 16 formed on the upper surface of the aqueous surfactant solution 14 substantially as shown in FIG. 1.

The second end 54 of the body member 50 can be connected to the bulkhead connection 58 of the primary cleaning vessel 12 by any conventional means as long as a fluid-tight connection is formed between the second end 54 of the body member 50 and the fluid outlet 28 defined by the bulkhead connection 58, while maintaining fluid communication between the fluid flow passageway 56 of the body member 50 and the fluid outlet 28 of the primary cleaning vessel 12. For example, the second end 54 of the body member 50 may be provided with externally disposed threads 60 which are adapted to matingly engage internally disposed threads (not shown) in the bulkhead connection 58.

The body member 50 has a continuous side wall 62 having an outer peripheral surface; and the body member 50 has an outside diameter 66. A plurality of spatially disposed slots, such as slots 68 and 70, are formed through the continuous side wall 62 of the body member 50 so as to openly communicate with the fluid flow passageway 56 of the body member 50. The slots 68 and 70, which are disposed substantially parallel to an elongated axis 72 of the body member 50, extend from the first end 52 of the body member 50 and terminate a distance 74 (FIG. 3) from the second end 54 of the body member 50.

The suction skimmer 18 further includes a throttle assembly 76 supported on the body member 50 for varying the length of the slots 68 and 70 and thereby regulate the flow of the aqueous surfactant solution 14 into the fluid flow passageway 56 of the body member 50 so as to provide laminar flow of aqueous surfactant solution 14, which includes the layer of oil 16 formed on the upper surface of the aqueous surfactant solution 14, into the fluid flow passageway 56 of the body member 50 through the slots 68 and 70.

The throttle assembly 76 comprises a sleeve member 78 disposed about the continuous side wall 62 of the body member 50 and slidably movable thereon for varying the length of the slots 68 and 70 formed through the continuous side wall 62 of the body member 50. The sleeve member 78 is provided with an upper sleeve portion 80 and a lower sleeve portion 82. The upper sleeve portion 80 of the sleeve member 78 has a first end 84, a second end 86 and an inside diameter 88. The lower sleeve portion 82 of the sleeve member 78 has a first end 90, a second end 92 and an inside diameter 94. The inside diameter 88 of the upper sleeve portion 80 of the sleeve member 78 is greater than the outside diameter 66 of the body member 50 so that an annulus 96 is formed between the upper sleeve portion 80 and an adjacently disposed portion of the body member 50; whereas, the inside diameter 94 of the lower sleeve portion 82 substantially corresponds to the outside diameter 66 of the body member 50 so that the lower sleeve portion 82 can be frictionally supported on and movable along the body member 50.

The first end 90 of the lower sleeve portion 82 is connected to the second end 86 of the upper sleeve portion 80 so as to define a closed lower end 98 of the annulus 96. Thus, when the lower sleeve portion 82 is disposed about the body member 50, the lower sleeve portion 82 frictionally engages the continuous side wall 62 of the body member 50 so that the sleeve member 78 can be disposed in a desired position on the body member 50 while permitting the sleeve member 78 to be slidably moved along the body member 50 to vary the length of the slot 68 and 70.

The suction skimmer 18, as well as the components thereof, can be constructed of any suitable material having sufficient rigidity and which is inert and stable in the environment in which the suction skimmer 18 is used. For example, depending upon the nature of the aqueous surfactant solution to which the suction skimmer 18 is exposed, the suction skimmer 18 may be fabricated of either metal or plastic.

Figure 4:
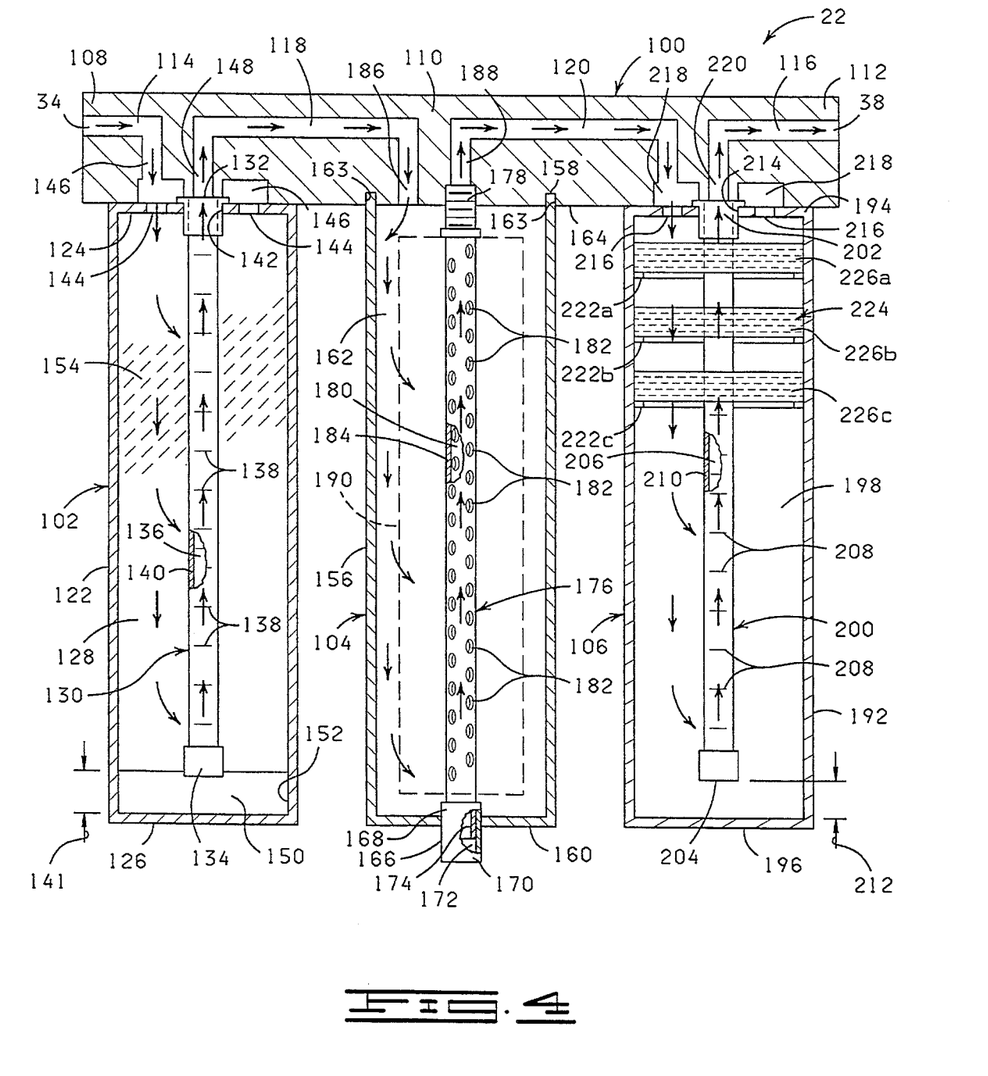
FIG. 4 is a side elevational view, partially in cross section, of a primary filter assembly of the parts washing system of the present invention.

As more clearly shown in FIG. 4, the primary filter assembly 22 includes a manifold 100, an oil absorbent filter 102, a particle filter 104 and a heavy metals filter 106. The manifold 100 is provided with a first end portion 108, a medial portion 110 and a second end portion 112. The first end portion 108 of the manifold 100 is provided with a fluid flow passageway 114 defining the inlet 34 of the primary filter assembly 22; and the second end portion 112 of the manifold 100 is provided with an fluid flow passageway 116 defining the outlet 38 of the primary filter assembly 22. The medial portion 110 of the manifold 100 is provided with fluid flow passageways 118 and 120 so that fluid communication is established between the oil absorbent filter 102, the particle filter 104 and the heavy metals filter 106 in a manner which will be described in detail herein after.

The oil adsorbent filter 102, which removes free oils from the aqueous surfactant solution 14, includes a filter case 122. The filter case 122 preferably is constructed of a plastic material or a metal with a plastic lining. In one form, the filter case 122 is a cylindrically shaped member having a closed upper end 124, a closed lower end 126 and a absorbent media chamber 128 extending therebetween.

The oil absorbent filter 102 further includes a tube 130 having an open first end 132, a closed second end 134 and a fluid flow passageway 136 extending therebetween. A plurality of spatially disposed slits 138 extend through a sidewall 140 of the tube 130 so as to provide fluid communication between the absorbent media chamber 128 of the filter case 122 and the fluid flow passageway 136 of the tube 130. The first end 132 of the tube 130 is connected to the upper end 124 of the filter case 122 and the second end 134 of the tube 130 terminates a distance 141 from the lower end 126 of the filter case 122.

The upper end 124 of the filter case 122 is provided with a substantially centrally disposed fluid outlet 142 and a fluid inlet 144 circumferentially disposed about the fluid outlet 142 substantially as shown. The upper end 124 of the filter case 122 is connected to the manifold 100 so that a downstream end portion 146 of the fluid flow passageway 114 of the manifold 100 is in fluid communication with the absorbent media chamber 128 of the filter case 122 via the fluid inlet 144 and an upstream end portion 148 of the fluid flow passageway 118 of the manifold 100 is in fluid communication with the fluid flow passageway 136 of the tube 130 via the fluid outlet 142 of the filter case 122.

The upper end 124 of the filter case 122 can be connected to the manifold 100 in any conventional manner so long as a fluid-tight seal is formed therebetween and fluid communication is provided between the fluid flow passageway 114 of the manifold 100 and the absorbent media chamber 128 of the filter case 122 and between the fluid flow passageway 136 of the tube 130 of the oil absorbent filter 102 and the fluid flow passageway 118 of the manifold 100. For example, the upper end 124 of the filter case 122 can be provided with an threaded male portion (not shown) which matingly engages a threaded female portion (also not shown) formed in the manifold 100 so as to provide a fluid-tight seal therebetween while providing fluid communication between the fluid flow passageway 114 of the manifold 100 and the absorbent media chamber 128 of the filter case 122 and between the fluid flow passageway 136 of the tube 130 of the oil absorbent filter 102 and the fluid flow passageway 118 of the manifold 100.

A foam spacer 150 is positioned in a lower portion 152 of the absorbent media chamber 128 and the remainder of the absorbent media chamber 128 is packed with an oil absorbent media 154. Any suitable oil absorbent media capable of absorbing free oils from the aqueous surfactant solution 14 can be employed. For example, desirable results have been obtained wherein the oil absorbent media 154 is a mixture of two absorbents, namely, a mixture of a block polymer which is capable of locking up free oils and a cellulose oil absorbent adapted to absorb free oils at a faster rate than the block polymer.

The cellulose oil absorbent may be formulated from any suitable cellulose material, such as scrap or waste paper; and the block polymer may be any block polymer capable of locking up free oils, such as the commercially available oil absorbent block polymer marketed by Petroleum Environmental Technologies, Inc. of Williamsburg, Mich.

The particle filter 104, which is positioned downstream of the oil absorbent filter 102, includes a filter case 156. The filter case 156 preferably is constructed of a plastic material or a metal with a plastic lining. In one form, the filter case 156 is a cylindrically shaped member having an open upper end 158, a closed lower end 160 and a filter cartridge chamber 162 extending therebetween.

The upper end 158 of the filter case 156 is disposed in a recess 163 formed in a lower side 164 of the manifold 100 so that the filter case 156 can be connected to the manifold 100 to provide a fluid-tight connection therebetween while providing fluid communication between the filter cartridge chamber 162 of the filter case 104 and the fluid flow passageways 118 and 120 of the manifold 100 in a manner hereinafter described in detail.

The closed lower end 160 of the filter case 156 is provided with a centrally disposed hub 166 having a first end portion 168 disposed within the filter cartridge chamber 162 and a second end portion 170 extending in an outwardly direction from the closed lower end 160 of the filter case 156 substantially as shown. The hub 166 defines a cavity 172 adapted to receive a lower end 174 of a filter cartridge stabilizing tube 176 so that the filter cartridge stabilizing tube 176 can be concentrically disposed within the filter cartridge chamber 162 and connected to the filter case 156.

The filter cartridge stabilizing tube 176, which has a length greater than the length of the filter case 156, is further characterized as having a threaded upper end portion 178, a fluid flow passageway 180 extending between the lower and upper ends 174 and 178, respectively, and a plurality of spatially disposed apertures 182 formed through a sidewall 184 of the filter cartridge stabilizing tube 176 so as to provide fluid communication between the filter cartridge chamber 162 of the filter case 156 and the fluid flow passageway 184 of the filter cartridge stabilizing tube 176. The threaded upper end portion 178 of the filter cartridge stabilizing tube 176 extends upwardly from the upper end 158 of the filter case 156 and is threadably connectable to the manifold 100 so that in an assembled position, the upper end 158 of the filter case 156 is disposed within the recess 163 formed in the lower side 164 of the manifold 100 and a fluid-tight connection is made between the manifold 100 and the filter case 156. If required, a gasket or an O-ring (not shown) can be positioned within the recess 163 to insure the formation of a fluid-tight seal between the manifold 100 and the filter case 156. Thus, when the filter case 156 is connected to the manifold 100, a downstream end portion 186 of the fluid flow passageway 118 of the manifold 100 is in fluid communication with the filter cartridge chamber 162 of the filter case 156 and an upstream end portion 188 of the fluid flow passageway 120 of the manifold 100 is in fluid communication with the fluid flow passageway 180 of the filter cartridge stabilizer tube 176 substantially as shown.

The particle filter 104 further includes a filter cartridge 190 (shown by phantom lines in FIG. 4). The filter cartridge 190 has a central passageway (not shown) extending therethrough so that the filter cartridge stabilizer tube 176 can be positioned therethrough to support and stabilize the filter cartridge 190 in the filter cartridge chamber 162 of the filter case 156 substantially as shown. Any commercially available filter cartridge capable of filtering particulate matter from the aqueous surfactant solution 14 and which can be positioned on the filter cartridge stabilizer tube 176 so as to be supported within the filter cartridge chamber 162 of the filter case 156 can be employed as the filter cartridge 190. Desirably, the filter cartridge will have a pore size of from about 0.5 to about 40 microns. An example of a commercially available filter cartridge which can be employed as the filter cartridge 190 of the particle filter 104 is a polypropylene particle filter cartridge having a pore size of about 5 microns manufactured by Mattson, Inc. of Barrington, Ill.

The heavy metals filter 106, which is positioned downstream of the particle filter 104, includes a filter case 192. The filter case 192 preferably is constructed of a plastic material or a metal with a plastic lining. In one form, the filter case 192 is a cylindrically shaped member having a closed upper end 194, a closed lower end 196 and a filter chamber 198 extending therebetween. The heavy metals filter 106 further includes a tube 200 having an open first end 202, a closed second end 204 and a fluid flow passageway 206 extending therebetween. A plurality of spatially disposed slits 208 extend through a sidewall 210 of the tube 200 so as to provide fluid communication between the filter chamber 198 of the filter case 192 and the fluid flow passageway 206 of the tube 200. The first end 202 of the tube 200 is connected to the upper end 194 of the filter case 192 and the second end 204 of the tube 200 terminates a distance 212 from the lower end 196 of the filter case 192.

The upper end 194 of the filter case 192 is provided with a substantially centrally disposed fluid outlet 214 and a fluid inlet 216 circumferentially disposed about the fluid outlet 214. Substantially as shown. The upper end 194 of the filter case 192 is connected to the manifold 100 so that a downstream end portion 218 of the fluid flow passageway 120 of the manifold 100 is in fluid communication with the filter chamber 198 of the filter case 192 via the fluid inlet 216 and an upstream end portion 220 of the fluid flow passageway 116 of the manifold 100 is in fluid communication with the fluid flow passageway 206 of the tube 200 via the fluid outlet 214.

The upper end 194 of the filter case 192 can be connected to the manifold 100 in any conventional manner so long as a fluid-tight seal is formed therebetween and fluid communication is provided between the fluid flow passageway 120 of the manifold 100 and the filter chamber 198 of the filter case 192 and between the fluid flow passageway 206 of the tube 200 and the fluid flow passageway 116 of the manifold 100. For example, the upper end 194 of the filter case 192 can be provided with an threaded male portion (not shown) which matingly engages a threaded female portion (also not shown) formed in the manifold 100 so as to provide a fluid-tight seal therebetween while providing fluid communication between the fluid flow passageway 120 in the manifold 100 and the filter chamber 198 of the filter case 192 and between the fluid flow passageway 206 of the tube 200 and the fluid flow passageway 116 in the manifold 100.

A plurality of spatially disposed ring-like supports 222 are secured to the filter case 192 and disposed in the filter chamber 198. Three supports 222 are shown in the drawing and designated therein by the individual reference numerals 222a, 222b and 222c.

A filter 224 includes a plurality of filter elements 226. Each of the filter elements 226 is disposed on one of the supports 222. Each of the supports 222 cooperates to support one of the filter elements 226 within the filter chamber 198 of the filter case 192 at a predetermined position. Three filter elements 226 are shown in the drawing and designated by the individual reference numerals 226a, 226b and 226c, respectively. More particularly, the filter element 226a is supported on the support 222a, the filter element 226b is supported on the support 222b and the filter element 226c is supported on the support 222c.

The number of filter elements 226 and cooperating supports 222 in the filter chamber 198 of the filter case 192 can vary and will generally depend upon the amount of heavy metals and other contaminants in the aqueous surfactant solution 14, the degree with which such heavy metals and other contaminants are to be removed from the aqueous surfactant solution 14 and the treatment rate (i.e. the desired rate of flow of the aqueous surfactant solution 14 through the filter elements 226), and the degree of pH control and bacterial growth control desired in the aqueous surfactant solution 14.

The filter elements 226 each are identical in construction and operation although it should be noted that the design parameters of each filter element 226 may vary if desired.

Each filter element 226 comprises metal particles bound together in an interconnected form of a porous metal, sponge-like structure. The metal particles are selected from a group of particles comprising zinc, copper, or combinations thereof. The metal particles preferably are of the type described in U.S. Pat. No. 5,135,654, titled "Method For Treating Fluids" issued to Heskett, Aug. 4, 1992, and U.S. Pat. No. 4,642,192 titled "Method Of Treating Fluids" issued to Heskett, Feb. 10, 1987, and U.S. Pat. No. 5,122, 274, titled "Method of Treating Fluids" issued to Heskett, Jun. 16, 1992 and the disclosure of each of these three patents specifically hereby are incorporated herein by reference.

The metal particles described before are commercially available from Fluid Treatment, Inc. of Constantine, Mich. and sold under the mark KDF. More particularly, particles sold by this company and identified by the mark KDF-55 have been found useful in forming the filter elements 226 of the heavy metals filter 106.

The commercially available metal particles described before are in a powder-like form. To form the sponge-like structure contemplated by the present invention, the particles are mixed with a carrier and applied to a foam structure. The foam structure then is subjected to heat and pressure to form the sponge-like structure. The method for forming sponge-like structures of metal or ceramics is well known in the art and commercially available through companies such as Astromet, Inc. of Cincinnati, Ohio.

The various parameters of the sponge-like filter elements 226 such as pore size and density may vary widely. Preferably, the pore size of the filter elements 226 is in a range from about 10 microns to about ¼ of an inch.

To prevent excessive foaming of the aqueous surfactant solution 14 in the primary cleaning vessel 14 during the cleaning of parts, the parts cleaning system 10 further includes a spray assembly 230 (FIG. 1) for intermittent spraying of a portion of the resulting filtrate produced by the primary filtering system 22 onto the surface of the aqueous cleaning solution 14 in the primary cleaning vessel 12. The spray assembly 230 includes a conduit 232 having a first end 234, a second end 236, a spray nozzle 238 and a valve 240 for controlling fluid flow through the conduit 232. The second end 236 of the conduit 232 is connected to the conduit 40 upstream of the throttle valve 42 so that fluid communication is established between the conduit 40 and the conduit 232. The first end 234 of the conduit 232, which has the spray nozzle 238 connected thereto, is disposed above the aqueous surfactant solution 14 in the primary cleaning vessel 12 so that when the valve 240 is opened, a portion of the resulting filtrate from the primary filtering system 22 can be sprayed into the primary cleaning vessel 12 to dissipate foam generated therein by the aqueous surfactant solution 14 and to wet and wash parts during the parts cleaning cycle of the parts washer system 10.

As previously stated, during the parts cleaning cycle of the parts washer system 10, the resulting filtrate (i.e. the filtered aqueous surfactant solution) produced by the primary filtering system 22 can be returned to the primary cleaning vessel 12 as a recycle stream, or the resulting filtrate can be divided into a first resulting filtrate stream and second resulting filtrate stream wherein the first resulting filtrate stream, which constitutes a major portion of the resulting filtrate, is returned to the primary cleaning vessel 12 and the second resulting filtrate stream, which constitutes a minor portion of the resulting filtrate, is passed through the secondary filter assembly 24 prior to being returned to the primary cleaning vessel 12.

As shown in FIG. 1, the secondary filter assembly 24 includes a reservoir 250 having a first fluid inlet 252, a second fluid inlet 254 and a fluid outlet 256. A first end 258 of a conduit 260 is connected to the conduit 40 downstream of the throttle control value 42, and a second end 262 of the conduit 260 is connected to the first fluid inlet 252 of the reservoir 250 so that fluid communication is established between the primary filter assembly 22 and the reservoir 250 of the secondary filter assembly 24 via conduits 40 and 260. A solenoid valve 264, having a restricted flow orifice (not shown), is disposed within the conduit 260 so that the flow of the portion of the resulting filtrate constituting the second stream through the conduit 260 and into the reservoir 250 can be selectively controlled. That is, and as will be more fully described herein after, the solenoid valve 264 is operably connected to a controller 265 which produces output signals to selectively open and close the solenoid valve 264 in response to the level of the resulting filtrate in the reservoir 250.

The secondary filter assembly 24 further includes a pump 266, an ultra filtration filter 268, a heavy metals filter 270 and a plurality of conduits 272, 274, 276, 278 and 280. Any pump capable of pumping the resulting filtrate through the ultra filtration filter 268 and the heavy metals filter 270 can be employed as the pump 266. However, the pump 266 is preferably a diaphragm pump because a diaphragm pump mixes oil and water to a lesser degree than a gear or a centrifugal pump.

The ultra filtration filter 268 includes a filter case 282. The filter case 282 is provided with a fluid inlet 284, a first fluid outlet 286 and a second fluid outlet 288 which are in fluid communication with a filter chamber (not shown) of the filter case 282. A filter element (also not shown), such as an ultra filtration membrane having a pore size of not greater than 50,000 angstrom, is positioned within the filter chamber of the filter case 282 so as to be disposed between the fluid inlet 284 and the first and second fluid outlets 286 and 288.

Ultra filtration filters which can be employed as the ultra filtration filter 268 of the secondary filter assembly 24 and having the specified pore size are commercially available filters distributed by Desalinization Systems, Inc. of Escondido, Calif. Thus, no further description of the ultra filtration filter 268 is believed necessary.

The heavy metals filter 270 includes a filter case 290. The filter case 290 is provided with a fluid inlet 292 at one end thereof and a fluid outlet 294 at an opposite end thereof. The fluid inlet 292 and the fluid outlet 294 are in fluid communication with a filter chamber 295 of the filter case 290. The filter chamber 295 of the filter case 290 can be packed with a media 296 active in reducing heavy metals, such as granulated manganese dioxide; or, in the alternative, one or more filter elements similar to the filter elements 226 of the heavy metals filter 106 of the primary filter assembly 22 herein before described can be disposed in the filter chamber 295 of the filter case 290. That is, the filter elements supported within the filter chamber (not shown) of the filter case 290 can be filter elements which comprise metal particles bound together in an interconnected form of a porous metal, sponge-like structure wherein the metal particles are selected from a group of particles comprising zinc and copper, or zinc, or copper, or combinations thereof.

The fluid outlet 256 of the reservoir 250 is connected to an inlet port (not shown) of the pump 266 via the conduit 272, and the inlet 284 of the ultra filtration filter 268 is connected to an outlet port (not shown) of the pump 266 via the conduit 274 so that fluid communication is provided between the reservoir 250, the pump 266 and the ultra filtration filter 268. The first fluid outlet 286 of the ultra filtration filter 268 is connected to the second fluid inlet 254 of the reservoir 250 via conduit 276 so that fluid communication is provided between the ultra filtration filter 268 and the reservoir 250. The second fluid outlet 288 of the ultra filtration filter 268 is connected to the fluid inlet 292 of the heavy metals filter 270 via conduit 278 and the fluid outlet 294 of the heavy metals filter 270 is connected to the secondary fluid inlet 27 of the primary cleaning vessel 12 via conduit 280 so that fluid communication is established between the ultra filtration filter 280 and the primary cleaning vessel 12, and thus between the reservoir 250 of the secondary filter assembly 24 and the primary cleaning vessel 12. Thus, upon passage of the resultant filtrate stream from the primary filter assembly 22 through the reservoir 250 and the ultra filtration filter 268, an ultra filtration concentrate stream is produced which is recycled to the reservoir 250 and an ultra filtration permeate stream is produced which is returned to the primary cleaning vessel 12 after passage through the heavy metals filter 270.

In order to remove any residual free oils which may be present in the resulting filtrate after passage of the aqueous surfactant solution 14 through the primary filter assembly 22, the secondary filter assembly 24 further includes an oil absorbent media disposed within the reservoir 250 so as to absorb any free oils present in the resulting filtrate. For example, an oil absorbent pillow 297 adapted to float on the resulting filtrate in the reservoir 250 and formed of a oil permeable material 298 filled with an oil absorbent media 300 can be employed as the oil absorbent media in the reservoir 250. The oil absorbent media 300 can be a mixture of a block polymer which is capable of locking up the free oil and a cellulose oil absorbent adapted to absorb the free oils at a faster rate than the block polymer (i.e. the oil absorbent media in the oil absorbent filter 102 of the primary filter assembly 22).

Figure 5:
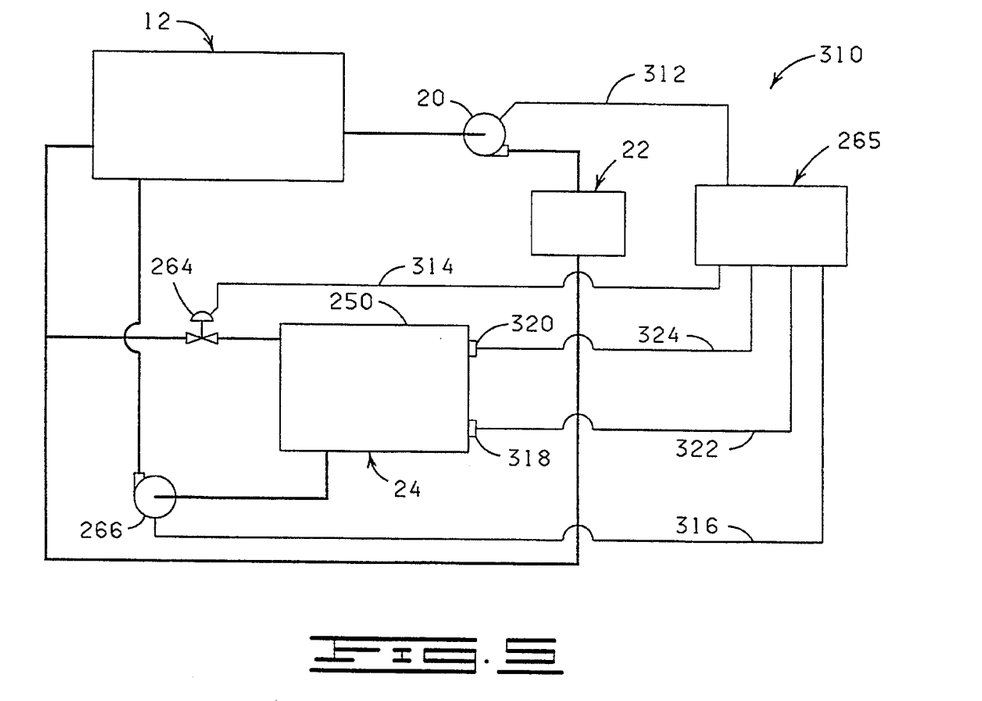
FIG. 5 is a schematic diagram of a control system of the parts washing system of FIG. 1.

As shown by the schematic diagram of FIG. 5, the parts washer system 10 is provided with a control system 310 for selectively controlling the flow of fluids therethrough. The control system 310 includes the controller 265 operably connected to the pump 20 of the primary filter assembly 122 via a signal path 312 and to the solenoid valve 264 and the pump 266 of the secondary filter assembly 24 via signal paths 314 and 316, respectively. The reservoir 250 is further provided with a first liquid level sensing unit 318 and a second liquid level sensing unit 320 for providing the controller 265 with signals indicative of a preset lower and upper level of liquid in the reservoir 250 via signal path 322 and 324, respectively.

The controller 265 is a conventional controller containing on and off switches, timers and the like. Thus, the controller 265 can selectively activate the pump 20 of the first filter assembly 22, while at the same time selective controlling the solenoid valve. 264 and activating the pump 266 of the secondary filter assembly 24 in response to signals received by the controller 265 from the first or second liquid level sensing units 318 and 320 of the secondary filter assembly 24.

Figure 6:
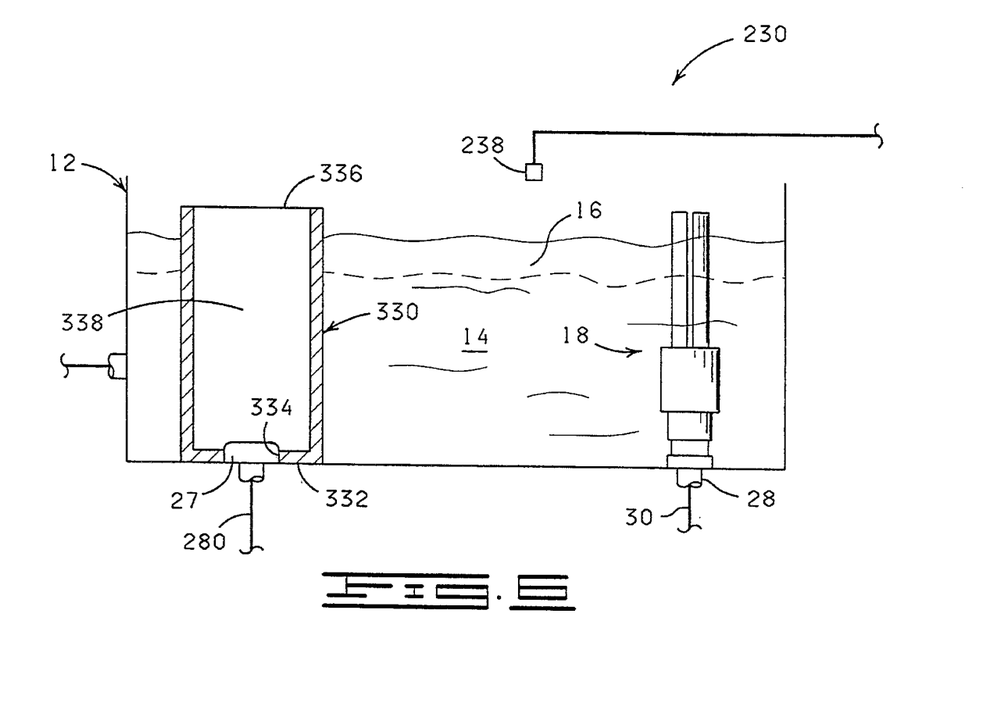
FIG. 6 is a partial diagrammatic view of the parts washer of FIG. 1 having a secondary cleaning vessel disposed within a primary cleaning vessel.

As shown in FIG. 6, to clean parts such as surgical instruments and other specialized parts requiring ultra clean surfaces, the parts washer system 10 further includes a secondary cleaning vessel 330 disposed within the primary cleaning vessel 12 so that parts (not shown) positioned in the secondary cleaning vessel 330 are subjected to cleaning with the portion of the resulting filtrate constituting the second stream which has been further purified by passage through the second filter assembly 24. That is, the aqueous surfactant cleaning solution for the secondary cleaning vessel 316 is a purified filtrate resultling from the passage of a minor portion of the resulting filtrate produced by primary filter assembly 22 through the secondary filter assembly 24.

The secondary cleaning vessel 330 is provided with a closed first end 332 having a fluid inlet 334, and open second end 336 and a parts washing chamber 338 extending therebetween. The secondary cleaning vessel 330 is positioned within the primary cleaning vessel 12 so that the fluid inlet 334 of the secondary cleaning vessel 330 is in fluid communication with the secondary fluid inlet 27 of the primary cleaning vessel 12 and a fluid-tight seal is formed therebetween and the open second end 336 of the secondary cleaning vessel 330 extends a distance above the aqueous surfactant solution 14 and the upper oil layer 16 in the primary cleaning vessel 12 substantially as shown in FIG. 1. Thus, the parts washing chamber 338 of the secondary cleaning vessel 330 is substantially isolated from the aqueous surfactant solution 14 and the upper oil layer 16 in the primary cleaning vessel 12 and contains a purified aqueous surfactant solution 340, i.e., an aqueous surfactant solution which consists of the portion of the ultra filtration permeate stream which has been passed through the heavy metals filter 270 of the secondary filter assembly 24. The purified aqueous surfactant solution 340 is discharged from the parts washing chamber 338 of the secondary cleaning vessel 330 via the open second end 336 thereof, and admixed with the aqueous surfactant solution 14 in the primary cleaning vessel 12.

In preparing the parts washer system 10 to clean and degrease parts, the aqueous surfactant solution 14 is made up so as to contain from about 25 to about 60 volume percent of a surfactant and from about 75 to about 40 volume percent water, and more desirably from about 50 volume percent of the surfactant and 50 volume percent of water. An effective amount of the aqueous surfactant solution 14 (i.e., the amount the aqueous surfactant solution 14 required to provide a desired level of the aqueous surfactant solution 14 in the primary cleaning vessel 14 and to provide a desired level of the aqueous surfactant solution in the reservoir 250 of the secondary filter assembly 24 to insure proper operation of the parts washer system 10) is then introduced into the primary cleaning vessel 12 and the reservoir 250 of the secondary filter assembly 24.

Any non-ionic surfactant having a substantially neutral pH and possessing grease removing properties can be employed as the surfactant constituent of the aqueous surfactant solution 14. For example, desirable results have been obtained wherein the aqueous surfactant solution contains a surfactant having a substantially neutral pH manufactured and marketed Chemical Products Industries, Inc. of Oklahoma City, Okla. under the trademark "Terrazyme 7".

In the parts cleaning mode or cycle of the parts washer system 10 wherein free oils, particulate matter and heavy metals produced during the cleaning of the parts in the primary cleaning vessel 12 are removed from the aqueous surfactant solution 14, and the bacterial growth and ph of the aqueous surfactant solution 14 is controlled, the valve 42 in the conduit 40 is opened and the pump 20 is actuated so that an upper portion of the aqueous surfactant solution 14, including the oil layer 16, is withdrawn from the primary cleaning vessel 12 via the slot 68 and 70 of the suction skimmer 18 under substantially laminar flow conditions. The flow of the aqueous surfactant solution 14 through the fluid flow passageway 56 of the suction skimmer 18 produces a stretched whirlpool vortex so that the aqueous surfactant solution 14 is gently fed to the pump 20. The aqueous surfactant solution 14 is then pumped to the manifold 100 and through the oil adsorbent filter 102 which contains two oil absorbents to produce a first filtrate substantially free of free oils. One of the oil absorbents of the oil absorbent filter 102 is a block polymer which physically locks up free oils and the other absorbent is a cellulose based absorbent which absorbs free oils faster than the polymer.

The first filtrate is then passed through the particle filter 104 which contains the replaceable particle filter 190 having a pore size of from about 0.5 to about 40 microns. Passage of the first filtrate through the particle filter 104 produces a second filtrate which is substantially free of particulate matter, i.e. metal fines and grit.

The second filtrate is then passed through the heavy metal filter 106 which contains metal particles bound together in an interconnected form of a porous metal, sponge-like structure. Passage of the second filtrate through the heavy metals filter 106 produces a third or resulting filtrate which is substantially free of dissolved heavy metals present in the second filtrate. Further, because of the design and construction of the heavy metals filter 106, passage of the second filtrate through the heavy metals filter 106 provides an effective way to control the pH and bacterial growth of the aqueous surfactant solution being processed in the parts washer system 10.

Depending upon the operational mode of the controller 265, the resulting filtrate can then be returned to the primary cleaning vessel 12 via conduit 40 and valve 42 as a recycle stream, and thereby by-pass the secondary filter assembly 24, or the resulting filtrate can be divided into a first resulting filtrate stream and a second resulting filtrate stream. The first resulting filtrate stream, which constitutes a major portion of the resulting filtrate, is returned to the primary cleaning vessel 12 via the conduit 40 and the valve 42; and the second resulting filtrate stream, which constitutes a minor portion of the resulting filtrate, is passed into the reservoir 250 of the secondary filter assembly 24 via the conduit 260 and the solenoid valve 264 for passage through the ultra filtration filter 268 and the heavy metals filter 270 prior to being returned to the primary cleaning vessel 12.

The flow path of the resulting filtrate produced by passage of the aqueous surfactant solution through the primary filter assembly 22 will be dependent upon control signals fed the solenoid valve 264 by the controller 265. For example, the controller 265 can be set to maintain the solenoid valve 264 in the closed position so that the resulting filtrate by-passes the secondary filter assembly 24 and is returned directly to the primary cleaning vessel 12. However, in a majority of operating conditions, signals are fed the controller 265 by the first and second liquid level sensing units 318 and 320 and, in response to such signals, the controller 265 selectively controls the solenoid valve 264 and the pump 266 so as to maintain a liquid level in the reservoir 250 between a preset lower and upper limit.

When the first liquid level sensing unit 318 senses the that the level of the resulting filtrate in the reservoir 250 has fallen to a predetermined level, the first liquid level sensing unit 318 provides a signal to the controller 265. In response to the signal from the first liquid level sensing unit 318, the controller 265 provides a control signal to the solenoid valve 264 which causes the solenoid valve 264 to open. When the solenoid valve 264 is in the open position the resultant filtrate is divided into the first and second resulting filtrate streams and the second resulting filtrate stream is introduced into the reservoir 250 of the secondary filter assembly 24 via the conduit 260 and the solenoid valve 264.

As previously stated, the second resulting filtrate stream constitutes a minor portion of the resulting filtrate. In order to limit the second resulting filtrate stream to a minor portion of the filtrate, the solenoid valve 264 is provided with a restricted orifice so that a restricted flow of the resultant filtrate is provided through the solenoid valve 264. For example, desirable results have been obtained wherein the solenoid valve 264 has an orifice size of about 5/64th of an inch.

Once the resulting filtrate reaches a predetermined level in the reservoir 250 of the secondary filter assembly 24, the second liquid level sensing unit 320 provides a signal to the controller 265. In response to the signal from the second liquid level sensing unit 320, the controller 265 provides a control signal to activate the pump 266 so that the resulting filtrate in the reservoir 250 is pumped through the ultra filtration filter 268 wherein the ultra filtration filter filtrate is divided into an ultra filtration concentrate stream and an ultra filtration permeate stream. The ultra filtration concentrate stream is returned to the reservoir 250 via the conduit 276 and the second fluid inlet 256 of the reservoir 250; and the ultra filtration permeate stream is passed through the heavy metals filter 270 and returned to the primary cleaning vessel via the conduit 280 and the secondary fluid inlet 27 as a purified filtrate substantially free of free, dissolved and emulsified oils, particulate matter and dissolved heavy metals.

As previously stated, the reservoir 250 contains an oil absorbent media such as the oil absorbent pillow 296. Thus, residual free oils remaining in the portion of the resultant filtrate introduced into the reservoir 250 of the secondary filter assembly 22 are substantially removed by contact with the absorbent pillow 22. Similarly, any particulate matters and dissolved heavy metals remaining in the portion of the resulting filtrate introduced into the reservoir 250 of the secondary filter assembly 22 are substantially removed by passage through the ultra filtration filter 268 and the heavy metals filter 270.

In the aqueous surfactant solution cleaning mode or cycle of the parts washer system 10, the valve 42 in the conduit 40 is opened and the pump 20 is inactivated so the aqueous surfactant solution 14, including the oil layer 16, is gravitationally withdrawn from the primary cleaning vessel 12 via the primary fluid inlet 26 of the primary cleaning vessel 12 and passed through a portion of the conduit 40, the throttle valve 42, the conduit 260, the solenoid valve 264 for discharge into the reservoir 250 of the secondary filter assembly 24 via the first fluid inlet 252 of the reservoir 250. The controller 265 is desirably provided with a timer (not shown) so that the parts washer system 10 can be maintained in the aqueous surfactant cleaning cycle for a specified period of time as well as during a specified period during the day or night.

When the resulting filtrate reaches a predetermined level in the reservoir 250 of the secondary filter assembly 24, the second liquid lever sensing unit 320 provides a signal to the controller 265 to activate the pump 266 so that the resulting filtrate can be with drawn from the reservoir 250 and pumped through the ultra filtration filter 268, the heavy metals filter 270 and returned to the primary cleaning vessel via the conduit 280 and the secondary fluid inlet 27.

During the aqueous surfactant solution cleaning cycle of the parts washer system 10, the ultra filtration filter filtrate is also divided into the ultra filtration concentrate stream (which is pumped via the pump 266 back to the reservoir 250) and the ultra filtration permeate stream (which is pumped via the pump 266 through the heavy metals filter 270 and into the primary cleaning vessel 12. The circulation of the aqueous surfactant solution as describe above is contained for a preselected period of time so that substantially all of the free oils, particulate matter and dissolved heavy metals are removed from the aqueous surfactant solution by continuous passage through the primary filter assembly 22 and the secondary filter assembly 24. At the end of the preselected time period the controller 265 deactivates the pump 266 and closes the solenoid valve 264 so as to prevent further flow of the aqueous surfactant solution 14 from the primary cleaning vessel 12 to the reservoir 250 of the secondary filter assembly 24.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. A method for treating an aqueous surfactant solution of a parts washer to remove free oils, particulate matter and dissolved heavy metals therefrom while controlling the pH and bacterial growth in the aqueous surfactant solution without chemical additives, the method comprising:

passing the aqueous surfactant solution through an oil absorbent filter to produce a first filtrate substantially free of oils;

passing the first filtrate through a particle filter to produce a second filtrate substantially free of particulate matter; and passing the second filtrate through a porous metal sponge-like structure formed of metal particles bound together in an interconnected form to produce a resultant filtrate of aqueous surfactant solution having a controlled pH which is resistant to bacterial growth without the addition of chemical additives and which is substantially free of oils, particulate matter and dissolved heavy metals.

2. A method for treating an aqueous surfactant solution of a parts washer wherein the aqueous solution is contaminated with free oils, particulate matter and dissolved heavy metals to produce a treated aqueous surfactant solution having a controlled pH and substantially free of bacteria and algae without the addition of chemical additives, and which is substantially free of free oils, particulate matter and dissolved heavy metals comprising:

passing the contaminated aqueous surfactant solution through an oil absorbent filter containing an oil absorbent media capable of absorbing free oils to produce a first filtrate;

passing the first filtrate through a particle filter having a pore size of from about 0.5 to about 40 microns to produce a second filtrate; and passing the second filtrate through at least one porous metal sponge-like structure formed of metal particles bound together in an interconnected form to produce a treated aqueous surfactant solution having a controlled pH which is substantially free of free oils, particulate matter and dissolved heavy metals and which is resistant to bacterial growth without the addition of chemical additives.

3. The method of claim 2 wherein the oil absorbent media is a block polymer capable of locking up free oils and a cellulose absorbent.

4. The method of claim 3 wherein the particle filter is a polypropylene particle filter.

5. The method of claim 4 wherein the polypropylene particle filter has an average pore size of about 5 microns.

6. The method of claim 2 wherein the particle filter is a polypropylene particle filter.

7. The method of claim 6 wherein the polypropylene particle filter has an average pore size of about 5 microns.

8. A method for treating an aqueous surfactant solution contaminated with free oils, particulate matter and dissolved heavy metals so that the aqueous surfactant solution can be reclaimed, the reclaimed aqueous surfactant solution having a substantially neutral pH and being substantially free of bacteria and algae, the method comprising:

providing a primary filter assembly comprising an oil absorbent filter containing an oil absorbent media capable of absorbing oil in the contaminated aqueous surfactant solution, a particle filter capable of removing particulate matter from the contaminated aqueous surfactant solution and a porous metal sponge-like structure formed of metal particles bound together in an interconnected form capable of removing dissolved heavy metals from the contaminated aqueous surfactant solution;

passing the contaminated aqueous surfactant solution through the oil absorbent filter to produce a first filtrate substantially free of free oils;

passing the first filtrate through the particle filter to produce a second filtrate substantially free of particulate matter; and passing the second filtrate through the porous metal sponge-like structure to provide a reclaimed aqueous surfactant solution having a substantially neutral pH which is substantially free of bacteria and algae without the addition of chemicals and which is also substantially free of free oils, particulate matter and dissolved heavy metals.

9. The method of claim 8 wherein in the step of providing the primary filter assembly the oil absorbent media is a block polymer capable of locking up free oil and a cellulose absorbent.

10. The method of claim 9 wherein in the step of providing the primary filter assembly the particle filter is a polypropylene particle filter.

11. The method of claim 9 wherein in the step of providing the primary filter assembly the particle filter is a polypropylene particle filter having an average pore size of about 5 microns.

12. The method of claim 8 wherein in the step of providing the primary filter assembly the particle filter is a polypropylene particle filter.

13. The method of claim 8 wherein in the step of providing the primary filter assembly the particle filter is a polypropylene particle filter having an average pore size of about 5 microns.

14. The method of claim 13 wherein in the step of providing the primary filter assembly the oil absorbent media is a block polymer capable of locking up free oils and a cellulose absorbent.

15. A method for treating an aqueous surfactant solution adapted to degrease and clean parts in a parts washer wherein the parts washer is provided with a primary cleaning vessel and wherein the aqueous surfactant solution is contaminated with residue including free oil, particulate matter and dissolved heavy metals removed from parts during the degreasing and cleaning of same by the aqueous surfactant solution, the method comprising:

withdrawing contaminated aqueous surfactant solution from the primary cleaning vessel;

passing the contaminated aqueous surfactant solution through an oil absorbent filter to produce a first filtrate substantially free of free oils;

passing the first filtrate through a particle filter to produce a second filtrate substantially free of particulate matter;

passing the second filtrate through at least one porous metal sponge-like structure formed of metal particles bound together in an interconnected form to provide resultant filtrate suitable for recycle as a purified aqueous surfactant solution to the primary cleaning vessel, the purified aqueous surfactant solution being resistant to bacterial growth and having a controlled pH wherein the metal particles of the porous metal sponge-like structure are selected from the group of particles consisting of zinc, copper and combinations thereof.

16. The method of claim 15 further comprising selectively spraying a portion of the resultant filtrate into the primary cleaning vessel to disperse foam generated in the primary cleaning vessel during the degreasing and cleaning of parts therein.

17. The method of claim 16 wherein the oil absorbent filter through which the contaminated aqueous surfactant solution is passed to produce the first filtrate contains an oil absorbent media comprising a block polymer capable of locking up free oils and a cellulose absorbent.

18. The method of claim 17 wherein the particle filter through which the contaminated aqueous surfactant solution is passed to produce the second filtrate is a polypropylene particle filter.

19. The method of claim 18 wherein the polypropylene particle filter has an average pore size of from about 0.5 to about 40 microns.

20. The method of claim 15 wherein the particle filter through which the contaminated aqueous surfactant solution is passed to produce the second filtrate is a polypropylene particle filter.

21. The method of claim 20 wherein the polypropylene particle filter has an average pore size of about 5 microns.

22. A method for removing free oils, particulate matter and dissolved heavy metals from an aqueous surfactant solution of a parts washer during a cleaning cycle of the parts washer wherein the parts washer includes a primary cleaning vessel containing the aqueous surfactant solution and adapted to hold the parts being cleaned and wherein the primary cleaning vessel is provided with a primary fluid inlet and a fluid outlet, the method comprising:

providing a suction skimmer in the primary cleaning vessel which is fluid communication with the fluid outlet of the primary cleaning vessel so that an upper portion of the primary cleaning surfactant solution is removed from the primary cleaning vessel via the suction skimmer and the fluid outlet of the primary cleaning vessel;

providing a primary filter assembly comprising an oil absorbent filter containing an oil absorbent media capable of absorbing free oils present in the aqueous surfactant solution, a particulate filter capable of removing particulate matter present in the aqueous surfactant solution and at least one porous metal sponge-like structure formed of metal particles bound together in an interconnected form and capable of removing dissolved heavy metals present in the aqueous surfactant solution wherein the metal particles of the porous metal sponge-like structure are selected from the group of particles consisting of zinc, copper, and combinations thereof;

pumping the aqueous surfactant solution removed from the primary cleaning vessel through the primary filter assembly to provide a resulting filtrate having a controlled pH and which is substantially free of bacteria and algae without the addition of chemicals and wherein the resulting filtrate is substantially free of free oils, particulate matter and dissolved heavy metals; and continuously introducing the resulting filtrate as a recycle stream into the primary cleaning vessel.

23. The method of claim 22 wherein in the step of providing the primary filter assembly the oil absorbent media in the oil absorbent filter is a block polymer capable of locking up free oils and a cellulose absorbent.

24. The method of claim 23 wherein in the step of providing the primary filter assembly the particle filter is a polypropylene particle filter.

25. The method of claim 23 wherein in the step of providing the primary filter assembly the particle filter is a polypropylene particle filter having an average pore size of about 0.5 to about 40 microns.

26. The method of claim 22 wherein in the step of providing the primary filter assembly the particle filter is a polypropylene particle filter.

27. The method of claim 22 wherein in the step of providing the primary filter assembly the particle filter is a polypropylene particle filter having an average pore size of from about 0.5 to about 40 microns.

28. A method for treating an aqueous surfactant solution of a parts washer to remove free oils, particulate matter and dissolved heavy metals from the aqueous surfactant solution when the parts washer is in a non-cleaning mode and the parts washer includes a primary cleaning vessel containing the aqueous surfactant solution and wherein the primary cleaning vessel is provided with a primary fluid inlet, a secondary fluid inlet and a fluid outlet, the method comprising:

withdrawing aqueous surfactant solution from the primary cleaning vessel via the fluid outlet of the primary cleaning vessel;

passing the withdrawn aqueous surfactant solution through a primary filter assembly comprising an oil absorbent filter containing an oil absorbent media capable of absorbing oil in the contaminated aqueous surfactant solution, a particle filter capable of removing particulate matter from the contaminated aqueous surfactant solution and a heavy metals filter capable of removing dissolved heavy metals from the contaminated aqueous surfactant solution to provide a resulting filtrate, the heavy metals filter having at least one filter element comprising metal particles bound together in an interconnected form of a porous metal sponge-like structure;

passing the resulting filtrate through a secondary filter assembly comprising a reservoir containing oil absorbent means for absorbing residual free oils present in the second resulting filtrate stream, an ultra filtration filter for removing residual particulate matter present in the second resulting filtrate stream and a heavy metals filter, the ultra filtration filter producing an ultra filtration concentrate stream and an ultra filtration permeate stream, the ultra filtration concentrate being recycled to the reservoir of the secondary filter assembly, the ultra filtration permeate stream being passed through the heavy metals filter so as to produce a purified filtrate substantially free of free, dissolved and emulsified oils, particulate matter and dissolved heavy metals; and returning the purified filtrate to the primary cleaning vessel via the secondary fluid inlet of the primary cleaning vessel.

29. The method of claim 28 wherein the aqueous surfactant solution is continuously withdrawn from the primary cleaning vessel and passed through the primary and secondary filter assemblies for return to the primary cleaning vessel for a period of time effective to provide a cleaned aqueous surfactant solution substantially free of free, dissolved and emulsified oils, particulate matter and dissolved heavy metals.

30. The method of claim 29 further comprising:

providing a suction skimmer in the primary cleaning vessel so that the suction skimmer is in fluid communication with the fluid outlet of the primary cleaning vessel and an upper portion of the aqueous surfactant solution is withdrawn from the primary cleaning vessel via the suction skimmer and the fluid outlet of the primary cleaning vessel and gravitionally fed through the first filter assembly.

31. The method of claim 30 wherein, in the step of providing the suction skimmer, the suction skimmer comprises:

a body member having a first end, a second end, a fluid flow passageway extending through at least a portion of the body member and openly communicating with the second end of the body member, and at least one slot formed in the body member and extending a selected distance from the first end toward the second end such that the slot openly communicates with the fluid flow passageway, the slot having an upper portion and a lower portion; and means for connecting the first end of the body member to the fluid outlet of the primary cleaning vessel such that the fluid flow passageway of the body member is in fluid communication with the fluid outlet of the primary cleaning vessel and the first end of the body member and the upper portion of the slot formed therein are disposed a distance above the aqueous surfactant solution in the primary cleaning vessel and the lower portion of the slot is disposed within the aqueous surfactant solution in the primary cleaning vessel.

32. The method of claim 31 wherein, in the step of providing the suction skimmer, the suction skimmer further comprises:

throttle means supported by the body member for varying the length of the slot so as to provide substantially laminar flow of the aqueous surfactant solution through the slot and into the fluid flow passageway of the body member.

33. The method of claim 32 wherein, in the step of providing the suction skimmer, the throttle means comprises:

a sleeve member disposed on the body member so as to be slidably movable thereon for varying the length of the slot.

34. The method of claim 33 wherein, in the step of providing the suction skimmer, the body member is a cylindrically shaped elongated body member having a peripheral surface and the sleeve member is provided with an upper sleeve portion and a lower sleeve portion, the upper sleeve portion having a first end and a second end, the upper sleeve portion disposed a distance from the peripheral surface of the cylindrically shaped elongated body member so that the upper sleeve portion cooperates with an adjacently disposed portion of the peripheral surface of the cylindrically shaped elongated body member to form an annulus therebetween, the lower sleeve portion having a first end and a second end, the second end of the lower sleeve portion connected to the first end of the upper sleeve portion so as to define a closed lower end of the annulus, the lower sleeve portion disposed about the peripheral surface of the cylindrically shaped elongated body member and frictionally engaging the cylindrically shaped elongated body member so that the sleeve member can be disposed in a desired position on the cylindrically shaped elongated body member while permitting the sleeve member to be slidably moved along the peripheral surface of the cylindrically shaped elongated body member to vary the length of the slots in the cylindrically shaped elongated body member.

35. The method of claim 30 wherein the oil absorbent media of the first filter assembly is a combination of a block polymer capable of locking up free oil and a cellulose absorbent and wherein the oil absorbent means of the second filter assembly contains an oil absorbent media which comprises a combination of a block polymer capable of locking up free oil and a cellulose absorbent.

36. The method of claim 35 wherein the particle filter of the primary filter assembly is a polypropylene particle filter.

37. The method of claim 36 wherein the polypropylene particle filter has an average pore size of from about 0.5 to about 40 microns.

38. The method of claim 30 wherein the particle filter of the primary filter assembly comprises a polypropylene particle filter and wherein the heavy metals filter means of the secondary filter assembly contains granulated manganese dioxide as a filter media.

39. The method of claim 38 wherein the polypropylene particle filter has an average pore size of about 0.5 to about 40 microns.

40. A method for removing heavy metal contaminants from an aqueous surfactant solution while controlling the pH of the aqueous surfactant solution and bacterial growth in the aqueous surfactant solution without the addition of chemical additives comprising:

passing the aqueous surfactant solution through a primary filter assembly having at least one porous metal sponge-like structure formed of metal particles bound together in an interconnected form of a porous metal sponge-like structure wherein the metal particles are a combination of zinc and copper.

41. A method for removing dissolved heavy metals, particulate matter and free oils from an aqueous surfactant solution comprising:

passing the aqueous surfactant solution through a primary filter assembly to produce a resulting filtrate, the primary filter assembly having at least one porous metal sponge-like structure of metal particles bound together in an interconnected form wherein the metal particles are a combination of zinc and copper; and passing the resulting filtrate through a secondary filter assembly comprising an oil absorbent and an ultra filtration filter to provide an ultra purified filtrate having a substantially neutral pH and which is substantially free of bacterial growth and algae without addition of chemical additives and wherein the ultra purified filtrate is substantially free of free oils, particulate matter and dissolved heavy metals.

42. A method for continuously removing free oils, particulate matter and dissolved heavy metals from an aqueous surfactant solution of a parts washer during a cleaning cycle of the parts washer wherein the parts washer includes a primary cleaning vessel containing the aqueous surfactant solution and adapted to hold the parts being cleaned and wherein the primary cleaning vessel is provided with a primary fluid inlet, a secondary fluid inlet and a fluid outlet, the method comprising:

withdrawing aqueous surfactant solution from the primary cleaning vessel via the fluid outlet thereof;

passing the withdrawn aqueous surfactant solution through a primary filter assembly comprising an oil absorbent filter containing an oil absorbent media capable of absorbing oil in the contaminated aqueous surfactant solution, a particle filter capable of removing particulate matter from the contaminated aqueous surfactant solution and a heavy metals filter capable of removing dissolved heavy metals from the contaminated aqueous surfactant solution to provide a resulting filtrate, the heavy metals filter having at least one filter element comprising metal particles bound together in an interconnected form of a porous metal sponge-like structure;

dividing the resulting filtrate into a first resulting filtrate steam and a second resulting filtrate stream;

passing the first resulting filtrate stream to the primary cleaning vessel via the primary fluid inlet of the primary cleaning vessel;

passing the second resulting filtrate stream through a secondary filter assembly comprising a reservoir containing oil absorbent means for absorbing residual free oils present in the second resulting filtrate stream, an ultra filtration filter for removing residual particulate matter present in the second resulting filtrate stream and a heavy metals filter, the ultra filtration filter producing an ultra filtration concentrate stream and an ultra filtration permeate stream, the ultra filtration concentrate stream being recycled to the reservoir of the secondary filter assembly, the ultra filtration permeate stream being passed through the heavy metals filter so as to produce an ultra purified filtrate; and returning the ultra purified filtrate to the primary cleaning vessel via the secondary fluid inlet of the primary cleaning vessel.

43. The method of claim 42 wherein, prior to the step of dividing the resulting filtrate into the first and second resulting filtrate streams, further comprising selectively spraying a portion of the resulting filtrate into the primary cleaning vessel to disperse foam generated in the primary cleaning vessel during the degreasing and cleaning of parts therein.

44. The method of claim 42 further comprising:

providing a secondary cleaning vessel within the primary cleaning vessel so the ultra purified filtrate is discharged therein and passes through the secondary cleaning vessel prior to being discharged into the primary cleaning vessel.

45. The method of claim 44 wherein, prior to the step of dividing the resulting filtrate into the first and second resulting filtrate streams, further comprising selectively spraying a portion of the resulting filtrate into the primary cleaning vessel to disperse foam generated in the primary cleaning vessel during the degreasing and cleaning of parts therein.

46. The method of claim 42 further comprising:

providing a suction skimmer in the primary cleaning vessel such that the aqueous surfactant solution is withdrawn from the primary cleaning vessel via the suction skimmer; and passing the withdrawn aqueous surfactant solution through pump means for pressurizing the aqueous surfactant solution prior to passing same through the first filter assembly.

47. A method for removing free oils, particulate matter and dissolved heavy metals from an aqueous surfactant solution of a parts washer during a cleaning cycle of the parts washer wherein the parts washer includes a primary cleaning vessel containing the aqueous surfactant solution and adapted to hold the parts being cleaned and wherein the primary cleaning vessel is provided with a primary fluid inlet and a fluid outlet, the method comprising:

providing a suction skimmer in the primary cleaning vessel which is in fluid communication with the fluid outlet of the primary cleaning vessel so that an upper portion of the primary cleaning surfactant solution is removed from the primary cleaning vessel via the suction skimmer and the fluid outlet of the primary cleaning vessel, the suction skimmer comprising:

a body member having a first end, a second end, a fluid flow passageway extending through at least a portion of the body member and openly communicating with the second end of the body member and at least one slot extending along a portion of the body member and openly communicating with the fluid flow passageway, the second end of the body member connectable to the fluid outlet of the primary cleaning vessel so that fluid entering the fluid flow passageway of the body member via the slot is discharged therefrom via the fluid outlet of the primary cleaning vessel;

providing a primary filter assembly comprising an oil absorbent filter containing an oil absorbent media capable of absorbing free oils present in the aqueous surfactant solution, a particulate filter capable of removing particulate matter present in the aqueous surfactant solution and a heavy metals filter capable of removing dissolved heavy metals from the aqueous surfactant solution, the heavy metals filter having at least one filter element comprising metal particles bound together in an interconnected form of a porous metal sponge-like structure wherein the metal particles are selected from the group of particles consisting of zinc or copper or combinations thereof;

pumping the aqueous surfactant solution removed from the primary cleaning vessel through the first filter assembly to provide a resulting filtrate;

introducing the resulting filtrate as a recycle stream into the primary cleaning vessel.

48. The method of claim 47 wherein, in the step of providing the suction skimmer, the suction skimmer further comprises:

throttle means supported by the body member for varying the length of the slot so as to provide substantially laminar flow of the aqueous surfactant solution through the slot and into the fluid flow passageway of the body member.

49. The method of claim 48 wherein, in the step of providing the suction skimmer, the throttle means comprises:

a sleeve member disposed on the body member so as to be slidably movable thereon for varying the length of the slot.

50. The method of claim 49 wherein, in the step of providing the suction skimmer, the elongated body member is provided with a substantially circular shaped cross section having a peripheral surface and wherein the throttle means comprises:

a sleeve member disposed about the peripheral surface of the elongated body member so as to be slidably movable thereon for varying the length of the slots, the sleeve member comprising an upper sleeve portion and a lower sleeve portion, the upper sleeve portion having a first end and a second end, the upper sleeve portion disposed a distance from the peripheral surface of the elongated member so that the upper sleeve portion cooperates with an adjacently disposed portion of the peripheral surface of the elongated body member to form an annulus therebetween, the lower sleeve portion having a first end and a second end, the second end of the lower sleeve portion connected to the first end of the upper sleeve portion so as to define a closed lower end of the annulus, the lower sleeve portion disposed about the peripheral surface of the elongated body member and frictionally engaging the elongated body member so that the sleeve member can be disposed in a desired position on the elongated body member while permitting the sleeve member to be slidably moved along the elongated body member to vary the length of the slots in the elongated body member.

51. The method of claim 48 wherein, in the step of providing the suction skimmer, the body member is an elongated body member having a peripheral surface and wherein the throttle means comprises:

a sleeve member disposed about the peripheral surface of the elongated member of the body member so as to be slidably movable thereon for varying the length of the slot, the sleeve member comprising an upper sleeve portion and a lower sleeve portion, the upper sleeve portion having a first end and a second end, the upper sleeve portion disposed a distance from the peripheral surface of the elongated member so that the upper sleeve portion cooperates with an adjacently disposed portion of the peripheral surface of the elongated member to form an annulus therebetween, the lower sleeve portion having a first end and a second end, the second end of the lower sleeve portion connected to the first end of the upper sleeve portion so as to define a closed lower end of the annulus, the lower sleeve portion disposed about the peripheral surface of the elongated body member and frictionally engaging the elongated body member so that the sleeve member can be disposed in a desired position on the elongated body member while permitting the sleeve member to be slidably moved along the elongated body member to vary the length of the slot in the elongated body member.

52. The method of claim 47 wherein, in the step of providing the suction skimmer, the body member is an elongated body member having a plurality of spatially disposed elongated slots extending from the first end of the elongated body member and terminating a distance from the second end thereof, and wherein the elongated body member further comprises means for connecting the second end of the elongated body member to the fluid outlet of the primary cleaning vessel so that a fluid-tight connection is formed therebetween and the first end of the elongated body member and a portion of the slots are disposed a distance above the aqueous surfactant solution in the primary cleaning vessel.

53. The method of claim 52 wherein, in the step of providing the suction skimmer, the suction skimmer further comprises:

throttle means supported by the elongated body member for varying the length of the slots and thereby maintaining substantially laminar flow of the aqueous surfactant solution into the fluid flow passageway of the body member.

54. The method of claim 53 wherein, in the step of providing the suction skimmer, the throttle means comprises:

a sleeve member disposed on the elongated body member so as to be slidably movable thereon for varying the length of the slots.

55. A method for removing free oils, particulate matter and dissolved heavy metals from an aqueous surfactant solution of a parts washer during a cleaning cycle of the parts washer wherein the parts washer includes a primary cleaning vessel containing the aqueous surfactant solution and adapted to hold the parts being cleaned and wherein the primary cleaning vessel is provided with a primary fluid inlet and a fluid outlet, the method comprising:

providing a suction skimmer in the primary cleaning vessel which is fluid communication with the fluid outlet of the primary cleaning vessel so that an upper portion of the primary cleaning surfactant solution is removed from the primary cleaning vessel via the suction skimmer and the fluid outlet of the primary cleaning vessel, wherein the suction skimmer comprises:

a cylindrically shaped elongated body member having a first end, a second end, an outer peripheral surface, an elongated axis extending from the first end to the second end and a plurality of spatial disposed slots formed therein, each of the slots being disposed substantially parallel to the elongated axis of the cylindrically shaped elongated member and extending from the first end of the body member and terminating a distance from the second end thereof; and throttle means supported by the cylindrically shaped elongated body member for varying the length of the slots and thereby controlling the flow rate of liquids through the fluid flow passageway of the cylindrically shaped elongated body member so as to provide substantially laminar flow of the aqueous surfactant solution through the slots and into the fluid flow passageway;

providing a primary filter assembly comprising an oil absorbent filter containing an oil absorbent media capable of absorbing free oils present in the aqueous surfactant solution, a particulate filter capable of removing particulate matter present in the aqueous surfactant solution and a heavy metals filter capable of removing dissolved heavy metals from the aqueous surfactant solution, the heavy metals filter having at least one filter element comprising metal particles bound together in an interconnected form of a porous metal sponge-like structure wherein the metal particles are selected from the group of particles consisting of zinc or copper or combinations thereof;

pumping the aqueous surfactant solution removed from the primary cleaning vessel through the primary filter assembly to provide a resulting filtrate; and introducing the resulting filtrate as a recycle stream into the primary cleaning vessel.

56. The method of claim 55 wherein, in the step of providing the suction skimmer, the throttle means comprises:

a sleeve member disposed on the peripheral surface of the cylindrical shaped elongated body member so as to be slidably movable thereon for varying the length of the slots.

57. The method of claim 56 wherein, in the step of providing the suction skimmer, the sleeve member is provided with an upper sleeve portion and a lower sleeve portion, the upper sleeve portion having a first end and a second end, the upper sleeve portion disposed a distance from the peripheral surface of the cylindrically shaped elongated body member so that the upper sleeve portion cooperates with an adjacently disposed portion of the peripheral surface of the cylindrically shaped elongated body member to form an annulus therebetween, the lower sleeve portion having a first end and a second end, the second end of the lower sleeve portion connected to the first end of the upper sleeve portion so as to define a closed lower end of the annulus, the lower sleeve portion disposed about the peripheral surface of the cylindrically shaped elongated body member and frictionally engaging the cylindrically shaped elongated body member so that the sleeve member can be disposed in a desired position on the cylindrically shaped elongated body member while permitting the sleeve member to be slidably moved along the peripheral surface of the cylindrically shaped elongated body member to vary the length of the slots in the cylindrically shaped elongated body member.

* * * * *

UNITED STATES PATENT AND TRADEMARK OFFICE
CERTIFICATE OF CORRECTION

PATENT NO. : 5,622,627

DATED : April 22, 1997

INVENTOR(S) : Fanning et al.

It is certified that error appears in the above-identified patent and that said Letters Patent is hereby corrected as shown below:

Column 1, line 6, please delete "08/117/265" and substitute therefor --08/117,265--.

Column 6, line 53, please delete "214.Substantially" and substitute therefor --214 substantially--.

Signed and Sealed this

Fifth Day of August, 1997

Attest:

BRUCE LEHMAN

Attesting Officer

Commissioner of Patents and Trademarks